July 3, 1934.  H. C. JONES  1,965,380
MECHANICAL MOVEMENT
Original Filed March 4, 1930  6 Sheets—Sheet 1

Inventor
Harry C. Jones
By his Attorney
Warren E. Willis.

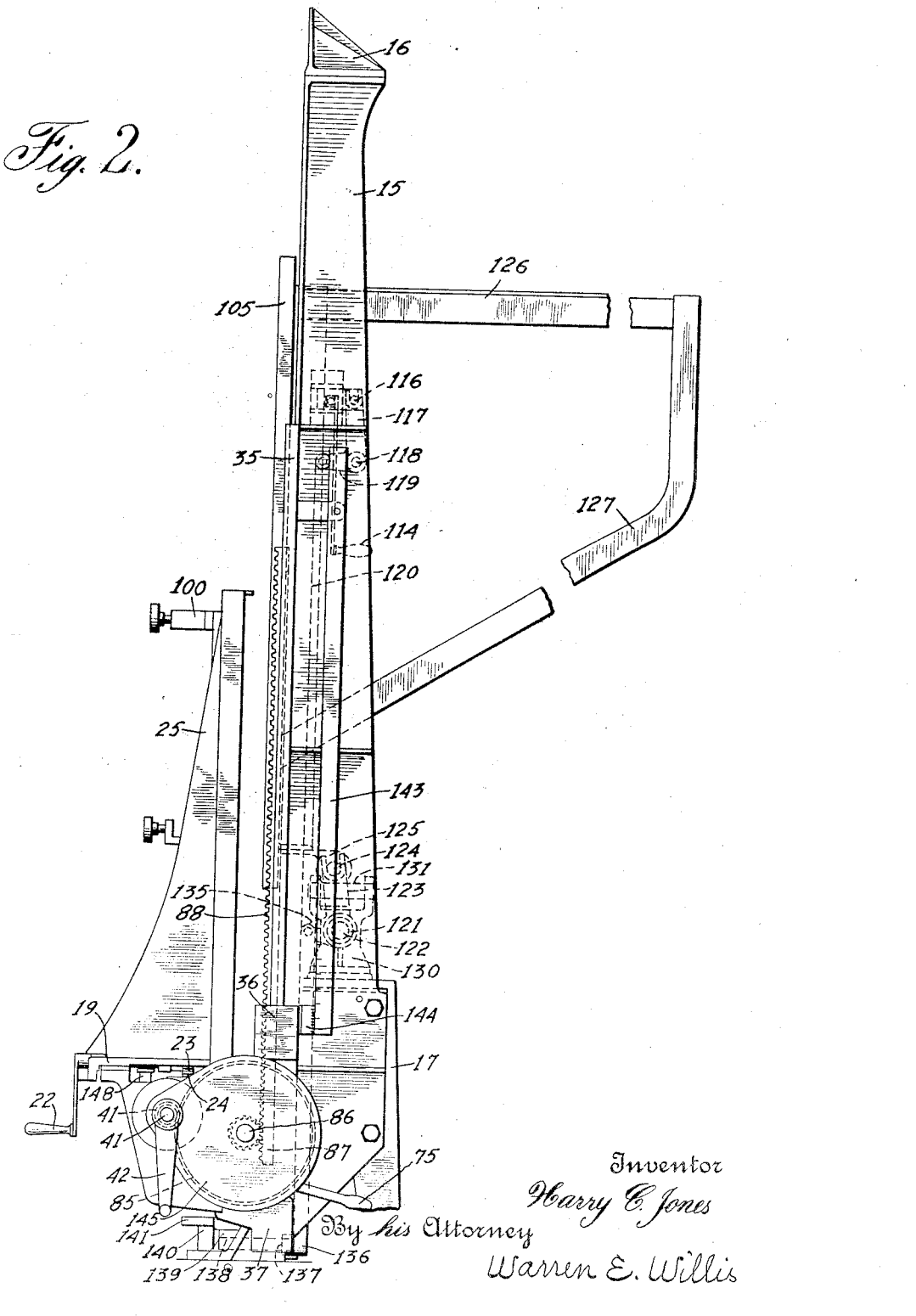

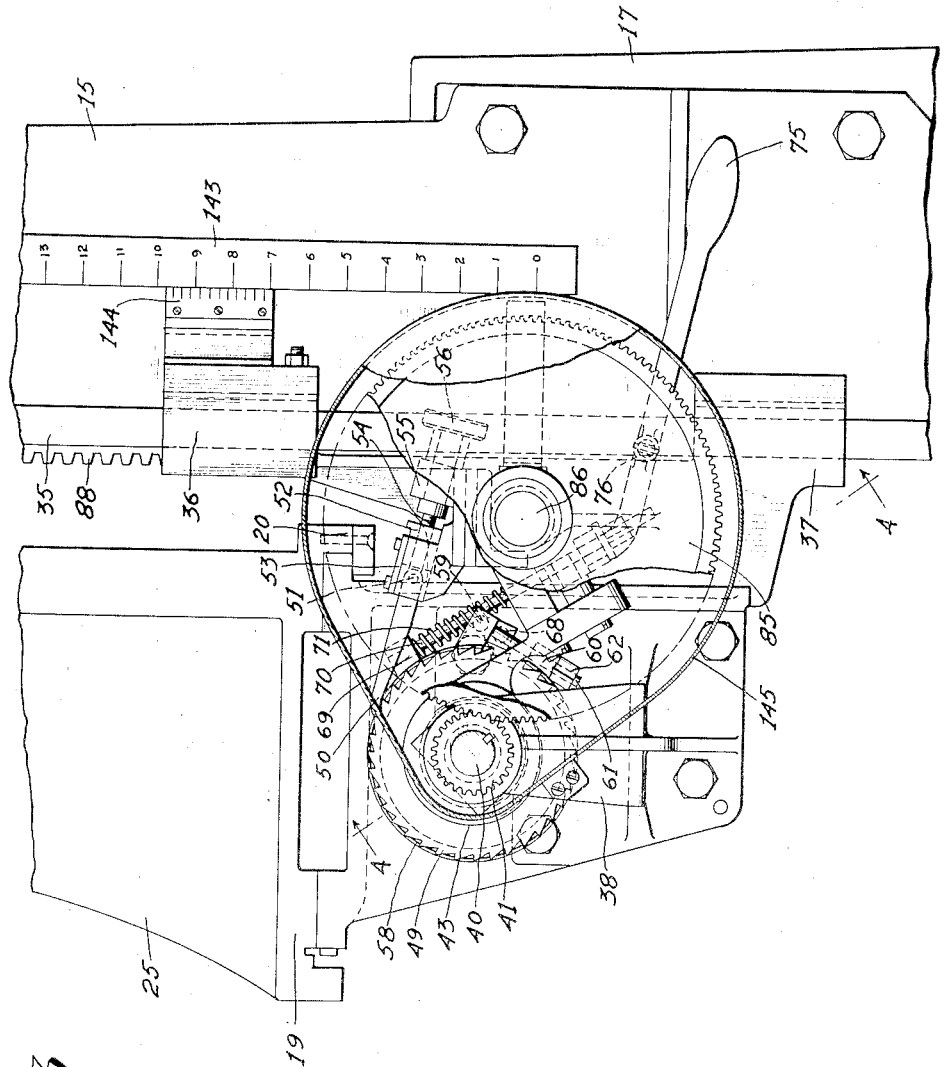

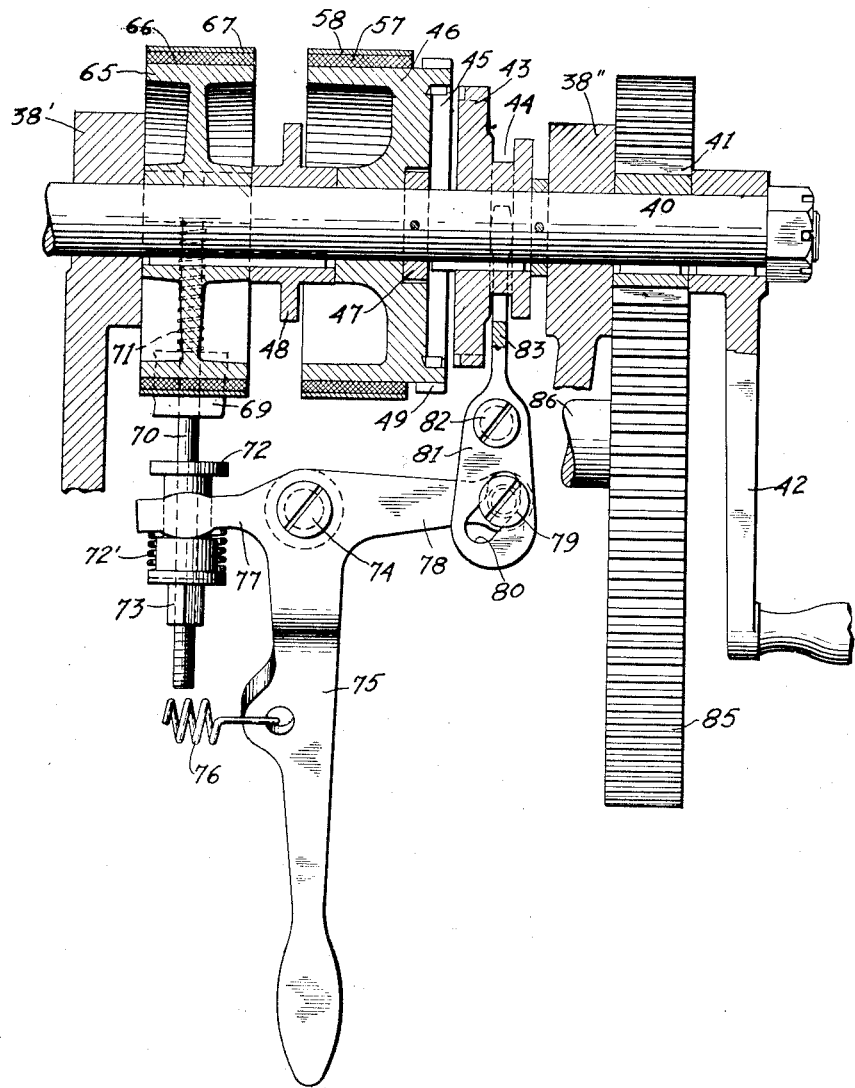

July 3, 1934.  H. C. JONES  1,965,380
MECHANICAL MOVEMENT
Original Filed March 4, 1930   6 Sheets-Sheet 5
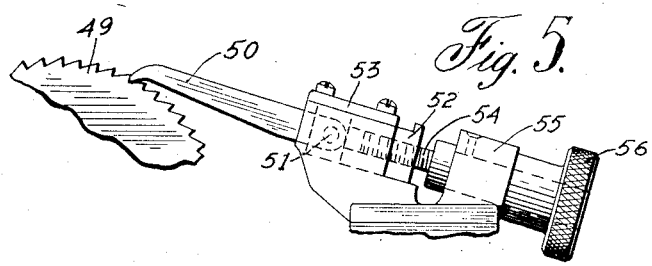
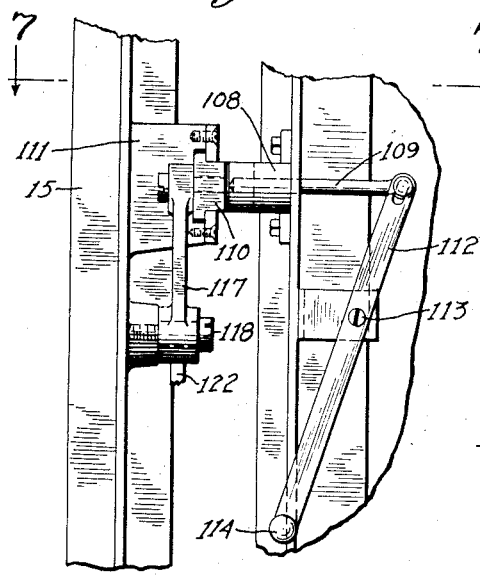
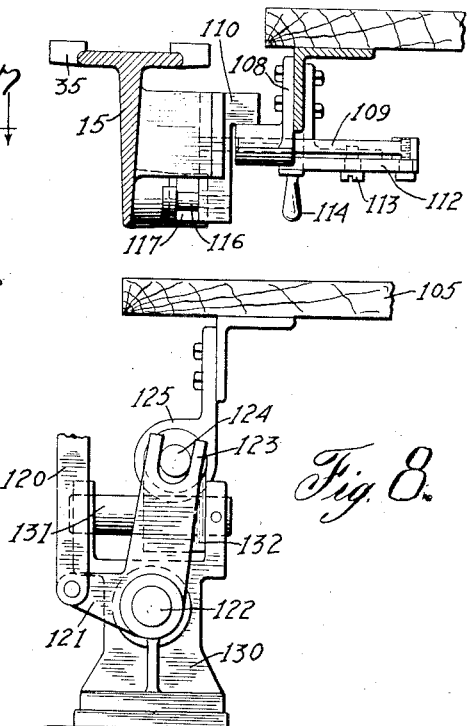
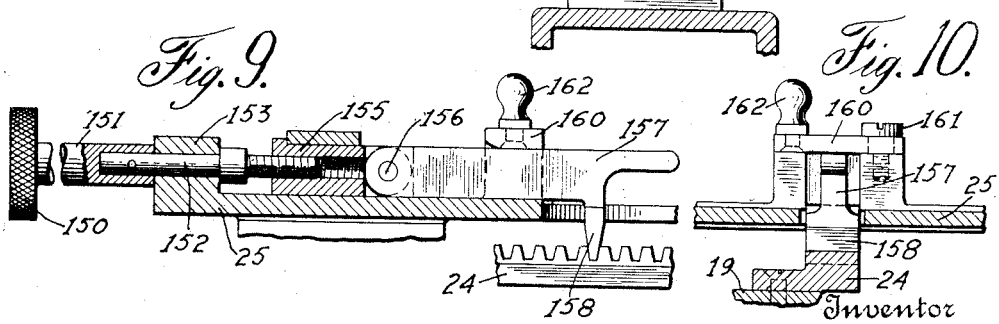
Inventor
Harry C. Jones
By his Attorney
Warren E. Willis July 3, 1934.  H. C. JONES  1,965,380
MECHANICAL MOVEMENT
Original Filed March 4, 1930   6 Sheets-Sheet 6
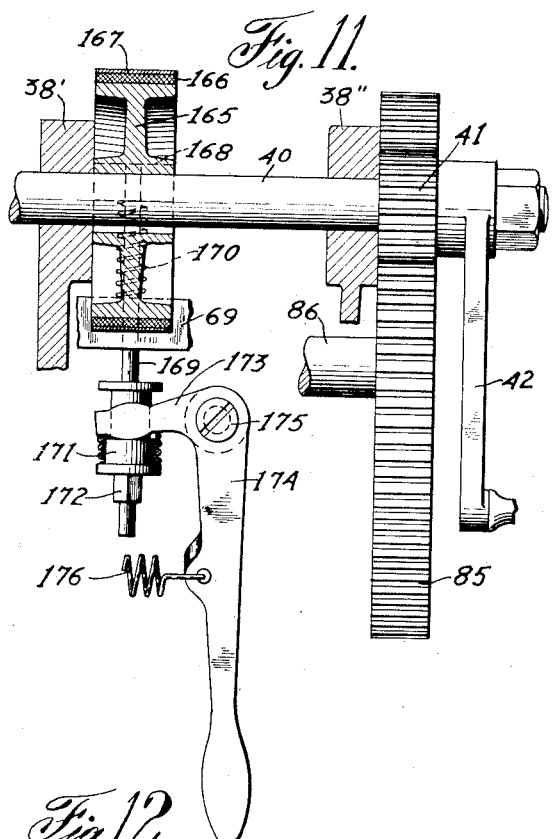
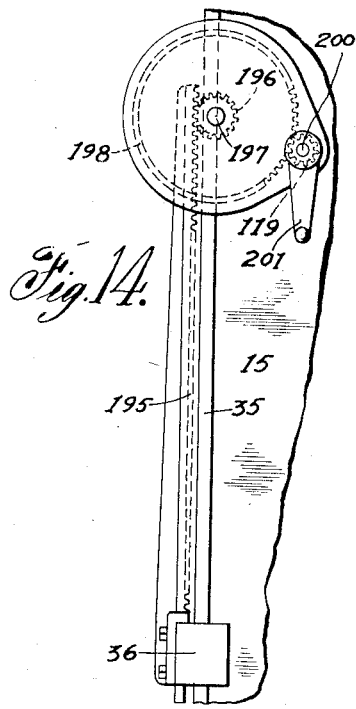
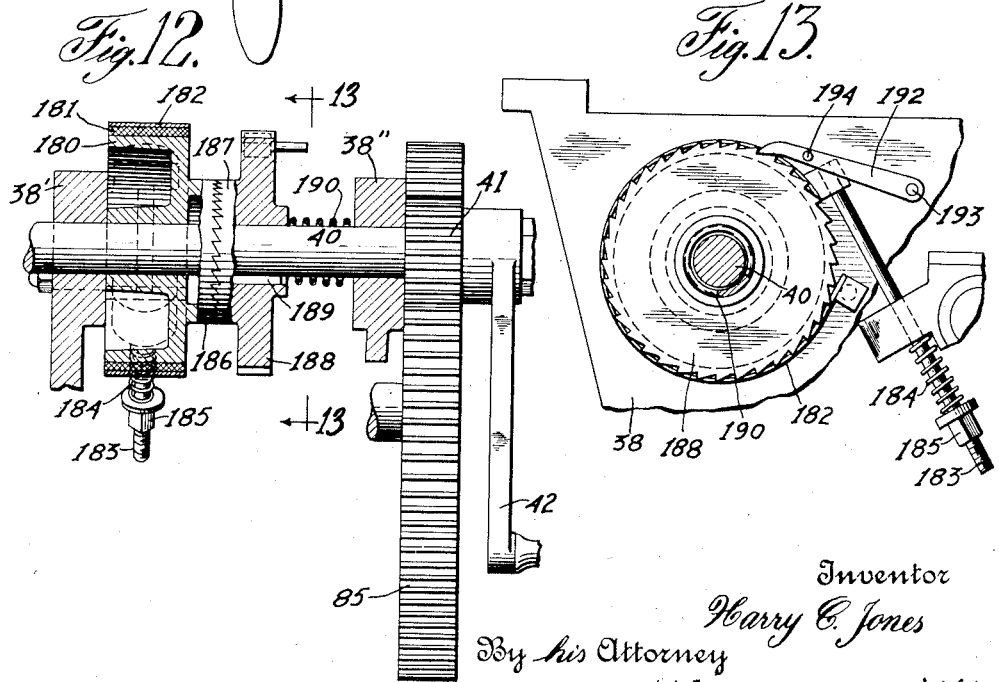
Inventor
Harry C. Jones
By his Attorney
Warren E. Willis

UNITED STATES PATENT OFFICE 1,965,380

MECHANICAL MOVEMENT

Harry C. Jones, New York, N. Y.

Original application March 4, 1930, Serial No. 433,002. Divided and this application February 24, 1931, Serial No. 517,724

14 Claims. (Cl. 95—73)

This invention relates to improvements in mechanical movements as applied in the raising and lowering of horizontal beams with relation to rigid uprights constituting fixed parts of a machine, and for moving a work carrying saddle longitudinally over a fixed horizontal beam, this application being divided from my co-pending application, filed March 4, 1930, Serial Number 433,002, and entitled "Photo-mechanical printing machines".

The making of all adjustments from a single convenient point on the machine is one object of the invention and more particularly that all adjustments be made smoothly, free from jar, shock or vibration.

A further feature is in the provision of means whereby such adjustments are made with unusual accuracy and may be exactly duplicated at any required time.

Another aim is to provide a friction clutch, combined with a manually operable brake, and having a highly refined and sensitive adjusting device by which the final adjustments are made by vernier indexes reading to the limit of required accuracy, and it is to be noted that the adjusting device is capable of wide and varied application where similar conditions exist and precision is essential.

These and other valuable objects are attained by the novel construction, combination and arrangement of parts hereinafter described and shown in the annexed drawings, forming a material part of this disclosure, and in which:—

Figure 2 is an end elevational view of the same looking from the right hand side.

Figure 3 is an enlarged partial side view of the same.

Figure 4 is a partial front elevational, partial sectional view of the brake, clutch and control device, looking on line 4—4 of Figure 3.

Figure 5 is a fragmentary side view of the adjusting device for vertical movement of the plate holder for final movement.

Figure 6 is a side view of the plate frame locking device.

Figure 7 is a transverse sectional view taken on line 7—7 of Figure 6.

Figure 8 is an end view of the same.

Figure 9 is a side elevational view, partially in section of the adjusting device for horizontal movement of the plate frame.

Figure 10 is a partial end view, partial sectional view of the same.

Figure 11 is a view similar to Figure 5 but showing a simplified clutch mechanism.

Figure 12 is another like view showing a further modification in construction.

Figure 13 is a transverse sectional view taken on line 13—13 of Figure 12.

Figure 14 is a fragmentary side elevational view showing a modification of tthe horizontal beam raising and lowering device.

Figure 1:
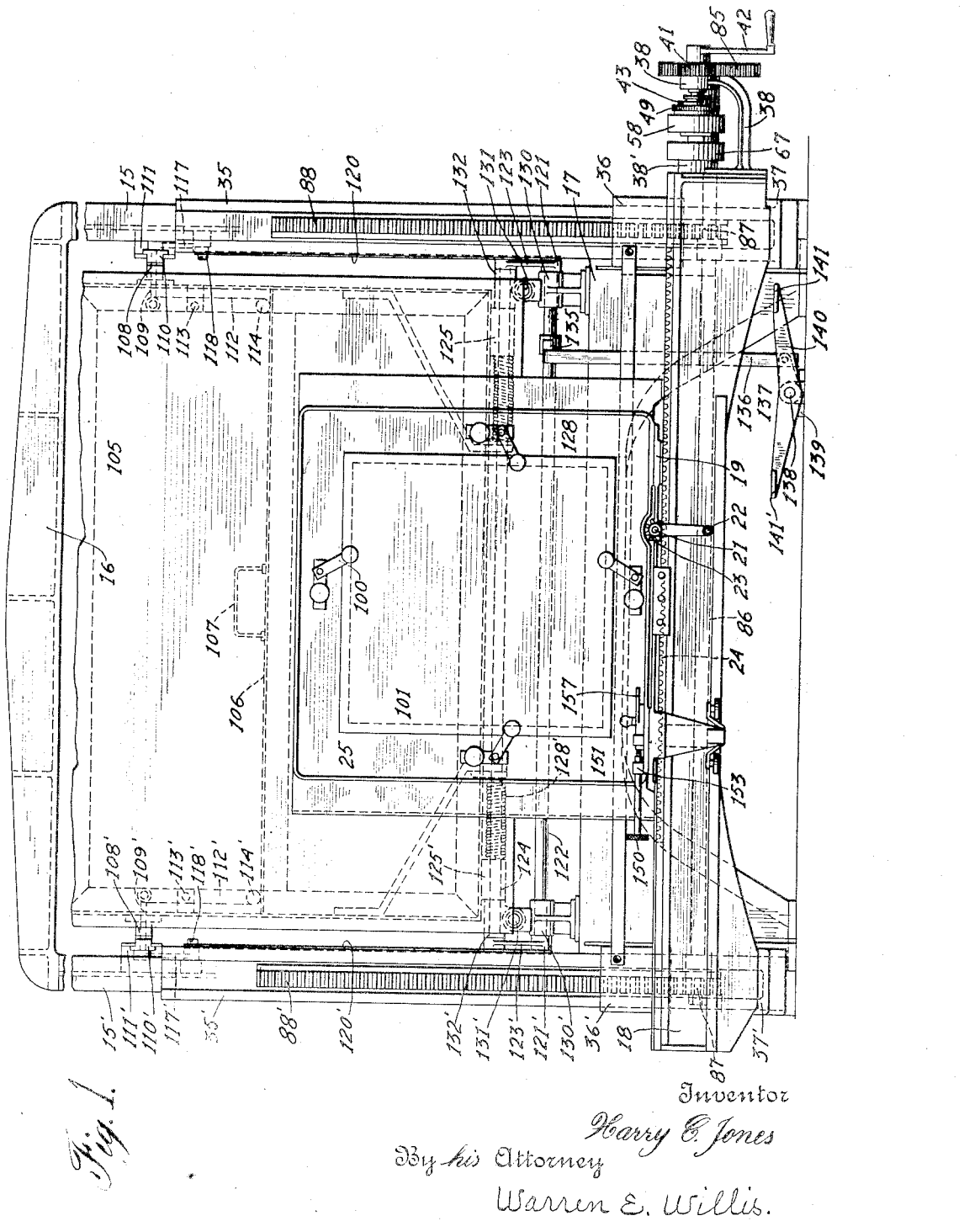
Figure 1 is a front elevational view of an embodiment of the machine.

By referring to the drawings, particularly figures 1 and 2, the machine will be seen to include a pair of spaced uprights 15—15' rigidly connected at their upper ends by a beam 16, and bolted between rearward extensions of the uprights near their lower ends is a fixed base 17 having converging legs terminating in feet disposed in the plane of the bases of the uprights.

A horizontal beam 18 vertically slidable on the finished faces of the upright 15—15' extending slightly outward at each end presenting a general right angle cross section, its upper horizontal, forwardly reaching element constituting an elongated saddle 19 having a level surface on the finished rear edge of which is engaged the rear edge of slide 20 reaching over and in front of the saddle.

Mounted transversely in the slide 20, near its right hand end, is a shaft 21 having fixed on its outer end a crank 22 for manual operation and at a point near the inner end of the shaft is fixed a spur pinion 23 meshed with a rack 24 secured on the saddle 19 to extend longitudinally the length required on the beam 18.

Rigidly supported on the saddle 19 is an upright rectangular frame 25 held by bolt and located by adjustable dowels, this frame 25 carrying the work parts as will hereafter appear.

The beam 18 is held to finish guide flanges 35—35' on the outer sides of the uprights 15—15' by brackets 36—36' and 37—37', respectively upper and lower, slidable up and down by manual means, see Figures 3 and 4.

Bolted to the right hand end of the beam 18 is a bracket 38 providing spaced bearings 38'—38" for a spindle 40 having keyed on it a spur pinion 41 and outwardly therebeyond a hand crank 42.

A toothed clutch disc 43 is slidably, but non-rotatably, mounted on the spindle and provided with an annular groove 44 in its hub; the disc is engageable in an internally toothed recess 45 in the adjacent side of a mating clutch member in the form of a wheel 46 freely rotatable on the spindle 40 and held from end movement thereon by a fixed collar 47 on one side and a keyed member 48 on the opposite, thrust taking side.

Part of the circular face of the wheel 46 is provided with teeth to form a ratchet 49, the teeth being engageable by a pawl 50, pivoted at 51 in a forked plunger 52 slidable in a guide 53, and actuated by a screw 54, threaded into the plunger, the screw being rotatable in a fixed block 55, and provided with a hand knob 56 by which the ratchet may be finely adjusted, the screw being prevented from endwise movement and the plunger having a limiting stop.

Engaging the periphery of the wheel 46 is friction lining 57 fixed to a brake band 58, one end of which is secured to a stud 59 set in the keyed member 48 and the other end to a collar 60 having a clearance hole to be freely slidable on a rod 61 and adjusted by a nut 62, the rod being carried by the member 48.

Further in on the spindle 40 is keyed another wheel 65 partially encircled by a brake lining 66 riveted to a strap or brake band 67 fixed at one end to a stud 68 set in the bracket 38, and attached at the other end to a collar 69 fixed on a spindle 70 slidably mounted and pressed outwardly by a spring 71, normally relaxing the brake.

Slidably mounted on the outer portion of the spindle 70 is a flanged collar 72 adjusted by a nut 73 screw-threaded on the outer end portion of the spindle, a part of the collar being encircled by a compression, take-up spring 72'.

Pivotedly mounted on a stud 74 set in the bracket 38 is a lever handle 75 drawn normally toward the beam 18 by a coiled tension spring 76. The handle 75 has at a point opposite the pivot an arm 77 forked at its outer end to engage the grooved collar 72 and actuate it against the effect of the take-up spring 72', setting the bands 66—67 against the brake wheel 65.

Another arm 78, opposite the arm 77, has fixed in it a stud 79 engaging an angular slot 80 in the outer end of a lever 81 pivoted at 82 and provided with an offset fork 83 engaging in the groove 44 of the slidable clutch element 43.

Engaging the pinion 41 is a spur gear 85 fixed on a horizontal shaft 86 mounted in bearings extending from the sliding brackets 36—37, and fixed on the shaft 86 are spur gears 87—87' meshed with racks 88—88' secured to the front faces of the uprights 15—15'.

From the foregoing it will be seen that upon actuation of the handle 42, the beam 18, and all parts carried by it, including the brackets 36—37 and frame 25 may be moved up and down in a vertical plane.

The frame 25 is provided with movable dowel devices 100 by which a negative holder 101 is located to carry a negative 102.

A bed plate holding frame 105 for carrying a work part, is provided with a cross bar 106 having a handle 107 at its center.

On the end members of the frame 105, near their upper ends are outwardly projecting brackets 108—108' drilled to slidably receive bolt bars 109—109', their inner ends being engageable in blocks 110—110' slidable in brackets 111—111' on the sides of the uprights 15—15'.

The inner ends of the bolts 109—109' are formed with eyes receptive of pins set in the upper ends of levers 112—112' pivoted at 113—113' to brackets extending in from the uprights, the lower ends of the levers being provided with operating handles 114—114'.

The blocks 110—110' have extensions in which are set rigid pins 116—116' seated in the forked upper ends of bell-crank lever arms 117—117' pivoted at 118—118' to bosses extending inwardly from the uprights 15—15'.

The other, forwardly extending, arms 119—119' of the bell-crank levers are pivotally engaged to the upper ends of vertical bars 120—120' which are in turn pivoted to in-reaching arms 121—121' of corresponding bell-cranks fixed on a longitudinal shaft 122, these levers having raised arms 123—123' terminating in forks in which are engaged the ends of a cross shaft 124.

Mounted on the shaft 124 are brackets 125—125' fixed to the lower edge of the frame 105, which has at its upper rear corners, right angled support bars 126—126', having braces 127—127', their lower ends being fixed to the frame and elements near their lower ends; the shaft 124 is encircled by torsional springs 128—128' having extending arms attached to the bed plate 105 to aid in raising and lowering the bed plate.

The shaft 122 is supported in brackets 130—130' mounted on top of the base 17, these brackets carrying at their forked upper ends pins 131—131' on which are mounted slidable blocks 132—132' pinned to the shaft 124.

At a point near the right hand end of the shaft 122 is fixed a lever 135 having at its forwardly projecting end a link 136 in turn pivotally connected to the outer end of a lever 137 fixed to a stub shaft 138 mounted in floor bracket 139.

Also fixed on the stub shaft 138 is an oscillating foot lever 140 having pedals 141—141' at each end by which the lever may be rocked in either direction, transmitting motion, through the link 136, to the shaft 122 and thence by the bell-crank levers, which operate in unison, to move the frame 105 limitedly to the rear.

Secured by brackets 142, carried by the upright 15, is an index bar 143 of a length equivalent to the distance that the cross beam 18 is capable of moving, this bar being preferably graduated in fractions of an inch and is readable in connection with a vernier plate 144 carried by the slide 36 closely adjacent, by which accurate adjustments may be made.

The bracket 36, is provided with bearings supporting the shaft 86 and its attached parts, over which is a guard cover 145 shielding the pinion 41 and gear 85.

A horizontal scale 148 is provided at the front contiguous of the horizontal rack 24, the scale being of a length equal to the cross movement of the negative frame 25 and is readable in connection with a vernier plate carried on the saddle 19.

The saddle is moved by action of the crank actuated pinion 23 along the rack for rough adjustment and for accurate final adjustment by rotating a knob 150 having a stem 151 bored to receive a spindle 152 journalled in a raised lug 153 and pinned in the stem 151.

A collar 154 on the spindle prevents it from moving lengthwise and the opposite end of the spindle is screw-threaded to engage a block 155 slidable on the frame 25 and carrying a pivot 156 by which is attached a latch 157 having a tooth 158 suited to engage between any two adjacent teeth of the rack 24.

This latch is held when in an engaged position by bar 160 pivoted at 161 and provided at the front with an operating knob 162.

When this device has been used to obtain the fine adjustment required the bar 160 is turned outwardly allowing the latch to be raised from connection with the rack in an obvious manner.

In the modified form of brake device shown in Figure 11, a brake drum 165 is shown as keyed to the shaft 40 closely adjacent the bearing 38', and provided with a lining 166 over which is a brake band 167. One end of this brake band is secured to a fixed element as 69, and the other to a block 168, actuated by a rod 169, normally pressed outwardly by a coiled compression spring 170.

Adjustable on the rod 169 is a sleeve 171 controlled by a nut 172, this sleeve having an annular groove to receive the forked element 173 of a lever 174, pivoted at 175, and normally drawn to relax the brake by a tension spring 176.

The foregoing is descriptive of the simplest form of the brake device for opposing the tendency of the weight of the negative frame, its saddle and the supporting beam 18 to drop by gravity, the action of the lever 174 serving to ease these elements as they are lowered.

In Figure 12 a brake wheel 180 is rotatably mounted on a shaft 40, and provided with a brake lining 181 and band 182 which may be stressed by the rod 183, as indicated also in Figure 13, the rod being normally pressed outward by an encircling coiled spring 184, the tension of which is adjusted by a nut 185 on its outer end.

Formed on the hub of the brake wheel 180 is a lateral ratchet 186 engaging with the teeth of a corresponding ratchet 187, formed on the adjacent lateral hub of a peripheral ratchet wheel 188, keyed to the shaft, as at 189, and pressed normally into engagement by a coiled compression spring 190 encircling the shaft 40 abutting the adjacent side of the gear 38''.

Engageable with the teeth of the gear 188 is a pawl 192 pivoted at 193, in a manner substantially identical to the device shown in Figure 5, the pawl being provided with a raising pin 194 for manual operation.

In the last described device it will be obvious that when the ratchets 186—187 are in an engaged position, the pawl 192 may be applied to the ratchet 188 in order to prevent rotary movement of the shaft 40, quite similar to that obtainable in the device shown in Figure 4, but somewhat less complicated in construction, and it will be understood that the brake device is of a frictional character only.

Referring to Figure 14, it will be seen that the brackets 36—36', which are rigidly carried by the ends of the beam 18 and are slidably mounted on the finished edges 35—35' of the uprights 15—15', have rigidly secured to them upwardly extending racks 195 with which are engaged spur pinions 196 fixed on a shaft 197, this shaft also carrying at its outer end a spur gear 198, meshed with a pinion 199 fixed on a spindle 200 and actuated by a crank handle 201, this device being of similar character to that already described, except in the later case the axes of the shafts 197—200 are fixed and not moved vertically as are the axes of the corresponding shafts 40—86, while the racks 195 move with the beam 18 in place of being rigidly secured to the faces of the uprights 15—15', this arrangement constituting a reversal of conditions and which may be preferable because of greater convenience in operation.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described the invention, what is claimed as new and desired to secure by Letters Patent, is:—

1. In means for adjusting a horizontal beam to predetermined positions in parallel planes, upright supports for said beam, racks on said supports, a shaft journalled horizontally on said beam, gears on said shaft meshed with said racks, a ratchet wheel on said shaft, a clutch to connect said ratchet wheel and said shaft, a brake on said shaft, and unitary means for operating said clutch and said brake coincidentally.

2. In means for adjusting a horizontal beam to predetermined positions in parallel planes, upright supports for said beam, racks on said supports, a shaft journalled on said beam, gears on said shaft meshed with said racks, a ratchet wheel on said shaft, means for revolving said ratchet wheel, a clutch controlling connections between said ratchet wheel and said shaft, a brake combined with said ratchet wheel, and means for operating said clutch and said brake simultaneously.

3. In means for adjusting a horizontal beam to predetermined positions in parallel planes, upright supports for said beam, racks on said upright supports, a shaft journalled on said beam, gears on said shaft meshed with said racks, a ratchet wheel on said shaft, a clutch controlling connections between said ratchet wheel and said shaft, and means for operating said clutch.

4. In means for adjusting a substantially horizontal beam to a predetermined height position, upright supports for said beam having fixed racks, a shaft on said beam having gears engaged in said racks, a ratchet wheel on said shaft, means for revolving said ratchet wheel, a clutch to connect said ratchet wheel and said shaft, a brake on said ratchet wheel, and means for operating said clutch and said brake coincidently.

5. In means for adjusting a horizontal beam to a predetermined position, upright supports for said beam having fixed racks, a shaft carried by said beam having gears engaged in said racks, a ratchet wheel loose on said shaft, a pawl to actuate said ratchet wheel, means for moving said pawl to slightly rotate said ratchet wheel, a clutch to connect said ratchet wheel and said shaft, and means of operating said clutch.

6. In means for adjusting a horizontal beam to a predetermined position, upright supports for said beam having fixed racks, a shaft having gears engaged in said racks, a ratchet wheel freely rotatable on said shaft, a pawl to actuate said ratchet wheel, means for moving said pawl to slightly rotate said ratchet wheel, a clutch to couple said ratchet wheel and said shaft, a brake controlling said ratchet wheel and said shaft, and means of operating said clutch and said brake.

7. In a machine having uprights provided with racks, a beam movable horizontally on said uprights, a shaft having gears engaged in said racks, manual means for primarily rotating said shaft to move said beam approximately into a predetermined position, a ratchet wheel rotatable on said shaft, means for clutching the wheel to said ratchet shaft, a pawl to engage the teeth of said wheel, a block in which said pawl is pivoted, and manual means including a screw to advance said block whereby the shaft is rotated to move said beam into its exact predetermined position.

8. In a machine having uprights, a horizontal beam movable up and down on said uprights, a shaft journalled on said beam, gears fixed on said shaft, racks on said uprights meshed with said gears, a manually rotatable spindle on said beam parallel with and geared to said shaft, a friction brake fixed on said spindle, a drag brake revoluble on the spindle, a ratchet combined with the drag brake, said drag brake having internal gear teeth, a gear keyed to said spindle engageable with said teeth, and a manually operable lever having arms to shift said gear into and out of mesh with the drag brake, and for controlling the friction brake simultaneously with shifting said gear.

9. In a machine having a pair of uprights provided with racks, a horizontal beam slidable vertically on said uprights, a shaft mounted on said beam carrying gears engaged with said racks, a spindle geared to said shaft, manual means for actuating said spindle, a manually controlled brake and a drag brake on the spindle, a ratchet wheel combined with the drag brake, a clutch controlling engagement between said ratchet wheel with the spindle, a pawl operative with respect to the ratchet wheel, and manual means for actuating said pawl in obtaining accurate adjustment of said shaft.

10. In means for accurately adjusting a horizontal beam to a predetermined height position, upright supports for said beam having fixed racks, a shaft on said beam having gears engaged in the racks, a spindle parallel the shaft provided with a hand crank, geared connections between said spindle and shaft, a friction brake rigid on said spindle, a drag brake rotatable on the spindle, said drag brake having ratchet teeth on a portion of its periphery, an internal gear in said drag break a spur gear slidably keyed to said spindle to engage the internal gear, a hand lever having an arm to set and release said friction brake, means on said lever to shift said gear coincidently with setting and releasing the friction brake, means for adjusting the friction on said drag brake, a pawl to engage said ratchet teeth, manual means to actuate said pawl, a scale on one of said supports, and a vernier movable with said beam relative to said scale.

11. In a machine having uprights provided with fixed racks, a load carrying beam movable up and down on said uprights, a shift journalled on said beam having gears meshed with said racks, and mechanical means for rotating said shaft wholly supported by said beam whereby the beam is raised and lowered.

12. In a machine having uprights provided with fixed racks, a load carrying beam movable up and down on said uprights, a shaft journalled on said beam having gears meshed with said racks, mechanically driven means for rotating said shaft wholly supported by said beam whereby the beam is raised and lowered, and other means for shifting the load on said beam longitudinally also carried wholly on the beam.

13. In a machine having a horizontal beam movable up and down therein, a shaft rotatable on said beam and having gears fixed on its ends, vertical racks in the machine engaged by said gears, a spindle on said beam having geared connections with said shaft, a drag brake free on said spindle, a friction brake fixed on the spindle, a toothed wheel slidable on said spindle to interengage said drag brake, and a T-shaped hand lever having opposed arms to coincidently shift said wheel relative to the drag brake and to control said friction brake.

14. In a machine having a horizontal beam movable up and down therein, a shaft rotatable on said beam and having gears fixed on its ends, upright racks extending the full height of the machine in spaced parallel relation, a shaft journalled on said beam, gears fixed on the ends of said shaft to engage the racks, a friction brake fixed on said shaft having an encircling band, a drag brake free on the shaft, and having internal teeth, a cog wheel mounted on the shaft to slide into engagement with the internal teeth of the drag brake, a pivoted shifting device for moving said wheel, a lever having an arm engaged with said shifting device, another arm to control the tension on said brake encircling band, a spring interposed in the connections between said arm and band, a third arm on said lever to act as a handle, and resilient means adapted to actuate said lever whereby said band is relaxed and said cog wheel engaged.

HARRY C. JONES.